United States Patent

Wu

[11] Patent Number: 5,304,926
[45] Date of Patent: Apr. 19, 1994

[54] GEARTOOTH POSITION SENSOR WITH TWO HALL EFFECT ELEMENTS

[75] Inventor: M. T. Wu, Madison, Wis.

[73] Assignee: Honeywell Inc., Minneapolis, Minn.

[21] Appl. No.: 865,010

[22] Filed: Apr. 8, 1992

[51] Int. Cl.$^5$ .................................................. G01B 7/30
[52] U.S. Cl. ............................. 324/207.2; 324/207.25
[58] Field of Search ................ 324/173, 174, 207.2, 324/207.14, 207.25, 207.21, 235, 251; 307/309; 338/32

[56] References Cited

U.S. PATENT DOCUMENTS

| | | | |
|---|---|---|---|
| 3,849,724 | 11/1974 | Ghibu et al. | 324/207.2 X |
| 4,093,917 | 6/1978 | Haeussermann | 324/207.2 |
| 4,524,932 | 6/1985 | Bodziak | 324/207.2 X |
| 4,535,289 | 8/1985 | Abe et al. | 324/207.2 X |
| 4,649,342 | 3/1987 | Nakamura | 324/207.21 |
| 4,692,702 | 9/1987 | Hüschelrath et al. | 324/235 |
| 4,745,363 | 5/1988 | Carr et al. | 324/207.2 |
| 4,785,242 | 11/1988 | Vaidya et al. | 324/207.25 |
| 4,853,632 | 8/1989 | Nagano et al. | 324/207.21 |
| 4,926,121 | 5/1990 | Guay | 324/207.2 |
| 4,926,122 | 5/1990 | Schroeder et al. | 324/207.13 |
| 4,972,332 | 11/1990 | Luebbering et al. | 364/565 |
| 4,982,155 | 1/1991 | Ramsden | 324/207.2 |
| 5,128,613 | 7/1992 | Takahashi | 324/235 |

FOREIGN PATENT DOCUMENTS

| | | | |
|---|---|---|---|
| 2420166 | 11/1975 | Fed. Rep. of Germany | 324/207.2 |
| 58-044301 | 3/1983 | Japan | 324/207.2 |
| 0497524 | 12/1975 | U.S.S.R. | 324/207.2 |
| 1580153 | 7/1990 | U.S.S.R. | 324/207.2 |

Primary Examiner—Gerard R. Strecker
Assistant Examiner—Warren S. Edmonds
Attorney, Agent, or Firm—William D. Lanyi

[57] ABSTRACT

A position sensor having two magnetically sensitive devices associated with a magnet. The sensor is disposable proximate a rotatable member having at least one discontinuity in its surface. The two magnetically sensitive devices, such as Hall effect transducers, each provide output signals that represent the direction and magnitude of the magnetic field in which its respective transducer is disposed. An algebraic sum of the first and second output signals from the magnetically sensitive devices is provided as an indication of the location of the rotatable member that is disposed proximate the sensor.

8 Claims, 5 Drawing Sheets

GEARTOOTH POSITION SENSOR WITH TWO HALL EFFECT ELEMENTS

BACKGROUND OF THE INVENTION

1. Field of the Invention

The present invention relates generally to devices which sense the position of a rotatable member and, more particularly, to a rotary position sensor that is suitable for use as a geartooth sensor or a slot sensor and which can provide information related to the speed or angular position of a rotatable member.

2. Description of the Prior Art

Many different types of sensors have been developed over the years to determine the angular position of a rotatable member. For example, sensors are very well known in the prior art for determining the rotational speed and direction of a gear having a plurality of teeth. In addition, sensors have been developed for determining the rate of rotation of a shaft, such as a camshaft, which is provided with a single discontinuity, or notch, in the outer periphery of the shaft.

U.S. Pat. No. 4,745,363, which issued to Carr et al on May 17, 1988, discloses a geartooth sensor which utilizes a Hall cell. It is intended for use in sensing gearteeth or similarly shaped discontinuities in a ferrous magnetic or magnetic target. It utilizes a single magnet and a direct coupled Hall cell integrated circuit to detect the presence or absence of gearteeth. It comprises spaced apart offset flux concentrators to provide a sensitive device with favorable tolerances in temperature and air gap.

U.S. Pat. No. 4,926,122, which issued to Schroeder et al on May 15, 1990, describes a high sensitivity magnetic circuit in which the stationary portion includes a permanent magnet whose width is optimally 1.5 times the tooth pitch of the exciter portion of the sensor and the magnet face proximate the exciter includes a thin layer of ferromagnetic material over which is centered a narrow magnetic sensing element, such as a magneto-resistor. The sensing element has a width typically less than the tooth width which is between 0.17 and 0.37 times the tooth pitch. The needed magnetic flux density is typically available simply by appropriate magnet thickness or choice of magnet material without the need of a flux guide.

U.S. Pat. No. 4,972,332, which issued to Luebbering et al on Nov. 20, 1990, discloses an apparatus for determining the speed, angular position and direction of rotation of a rotatable shaft. The apparatus is intended for use on an electronically controlled fuel injection system. It uses a single Hall effect sensor. A disk element is fixedly connected to and rotatable with the cam shaft of an internal combustion engine. The disc element includes a plurality of circumfrential zones of substantially identical length with each zone having first and second areas. A first portion of these circumfrential zones has first and second areas which are substantially different in length than the first and second areas of a second portion of the circumfrential zones. Therefore, the sensor delivers a signal which has a frequency directly related to the instantaneous velocity of the disc element, but varies in pulse width in response to the first and second portions of the circumfrential zones.

U.S. Pat. No. 4,853,632, which issued to Nagano et al on Aug. 1, 1989, describes an apparatus for magnetically detecting a position of a moveable magnetic body. It includes a three terminal magnetic field intensity sensing structure formed by a pair of magnetic resistors. The magnetic field intensity sensing structure is disposed opposite to a magnetic body arranged for movement relative thereto in a magnetic field and generates a first electrical signal of sinusoidal waveform in response to a change in the intensity of the magnetic field due to the relative movement of the magnetic body. This first electrical signal appears from the apparatus as a second electrical signal of rectangular waveform or a sinusoidal waveform having an amplified amplitude. Components of the circuit for shaping the waveform or amplifying the amplitude of the first electrical signal are integrally mounted together with the magnetic resistors on a substrate. Preferably, the shaping or amplifying circuit is in the form of a hybrid integrated circuit formed on the substrate.

Position sensors of the type described above typically exhibit several disadvantages when used in certain applications. For example, it is often difficult to accurately detect the speed of a rotatable member if only a single discontinuity is available in the surface of the member. In addition, upon initial start up of the system incorporating a position sensor, it is often difficult to precisely determine the position of the sensor relative to the rotatable member without first rotating the rotatable member.

SUMMARY OF THE INVENTION

In a preferred embodiment of the present invention, a sensor comprises a first magnetically sensitive device having a first output signal that is representative of the magnitude and direction of a magnetic field in which the first magnetically sensitive device is disposed. A second magnetically sensitive device has a second output signal that is representative of the magnitude and direction of a magnetic field in which the second magnetically sensitive device is disposed. In a most preferred embodiment of the present invention, the first and second magnetically sensitive devices are Hall effect transducers. The sensor further comprises a means, associated with the first and second magnetically sensitive devices, for disposing the first magnetically sensitive device in a magnetic field of a first direction and for disposing said second magnetically sensitive device in a magnetic field of a second direction. In a preferred embodiment of the present invention, the disposing means is a U-shaped magnet. The sensor also comprises a means for algebraically combining the first and second output signals to form a third output signal. The sensor is disposable proximate a moveable member having a surface with at least one discontinuity formed therein. The discontinuity can be a depression or a protrusion. The first and second magnetically sensitive devices are positioned to be sequentially proximate the discontinuity in response to movement of the rotatable member.

BRIEF DESCRIPTION OF THE DRAWINGS

The present invention will be more fully understood from a reading of the Description of the Preferred Embodiment in conjunction with the drawing, in which.

DESCRIPTION OF THE PREFERRED EMBODIMENT

Figure 1:
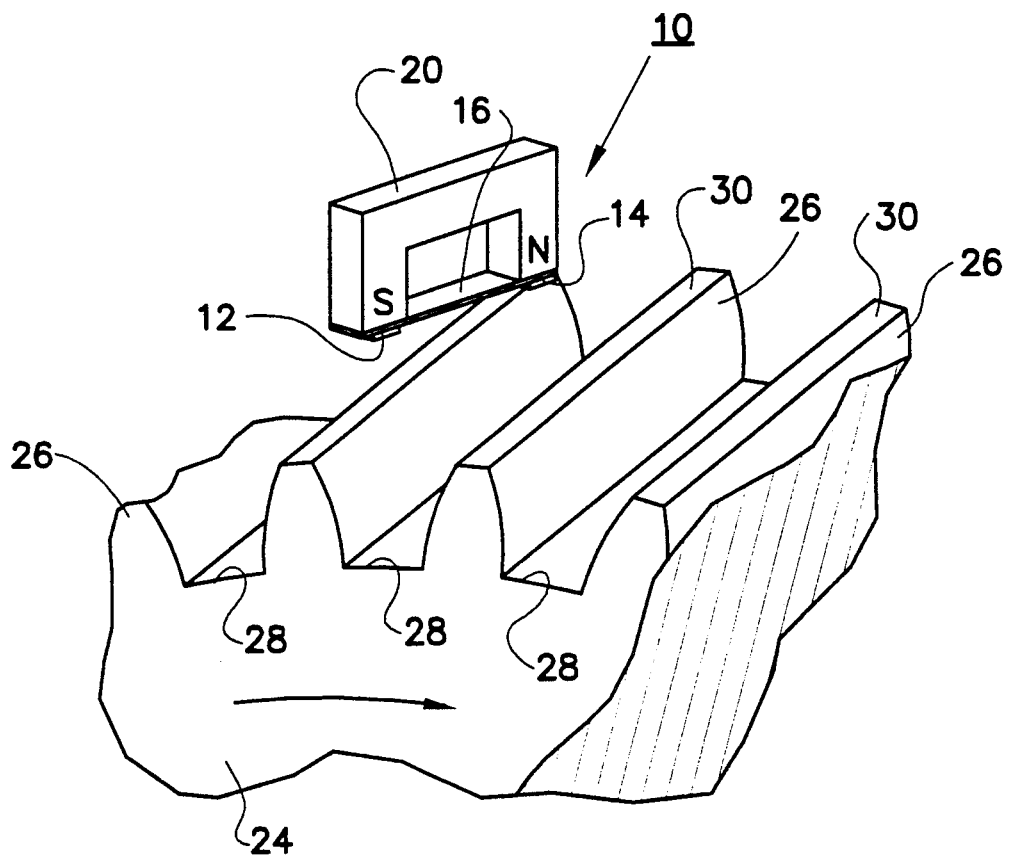
FIG. 1 shows a perspective view of the present invention associated with a gear having a plurality of teeth.

Throughout the Description of the Preferred Embodiment, like components will be identified with like reference numerals and letters.

FIG. 1 illustrates a perspective view of the present invention associated with a rotatable member, such as a gear, which has a plurality of discontinuities, such as teeth, formed in its peripheral surface. The present invention is generally identified by reference numeral 10. It comprises a first magnetically sensitive device 12 and a second magnetically sensitive device 14. In a preferred embodiment of the present invention, the first and second magnetically sensitive devices are Hall effect transducers. In FIG. 1, the first and second magnetically sensitive devices are disposed on a ceramic substrate 16 which can also support an electronic circuit to amplify first and second output signals that are provided by the first and second magnetically sensitive devices, respectively. In addition, certain embodiments of the present invention can also combine the first and second output signals and compare the combined signal to a reference magnitude.

With continued reference to FIG. 1, a magnet 20 provides a means for disposing the first magnetically sensitive device 12 in a magnetic field of a first direction and for disposing the second magnetically sensitive device 14 in a magnetic field of a second direction. As shown in FIG. 1, the U-shaped magnet 20 provides this disposing means because its south pole is proximate the first magnetically sensitive device 12 and its north pole is proximate the second magnetically sensitive device 14.

The sensor 10 is disposed proximate a rotatable member 24 which has at least one discontinuity in its surface. If the rotatable member 24 is a gear, as shown in FIG. 1, a plurality of teeth 26 extend from the outer periphery of the rotatable member 24. Between each tooth is a space 28. The sensor 10 is disposed proximate the rotatable member 24 in such a way that its first and second magnetically sensitive devices are simultaneously located proximate different regions of its outer periphery. In other words, when the first magnetically sensitive device 12 is proximate a tooth 26, the second magnetically sensitive device 14 is proximate a space 28. To achieve this result, the axis of the sensor 10 can be disposed at an angle relative to the axis of the rotatable member 24.

Figure 2:
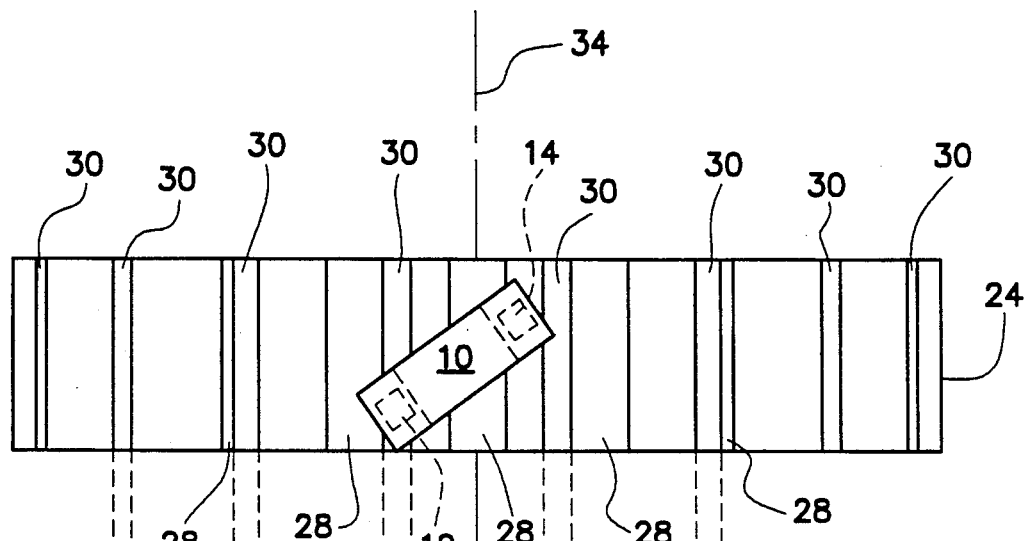
FIG. 2 shows a top view of the present invention associated with a rotatable member having a plurality of teeth.
Figure 3:
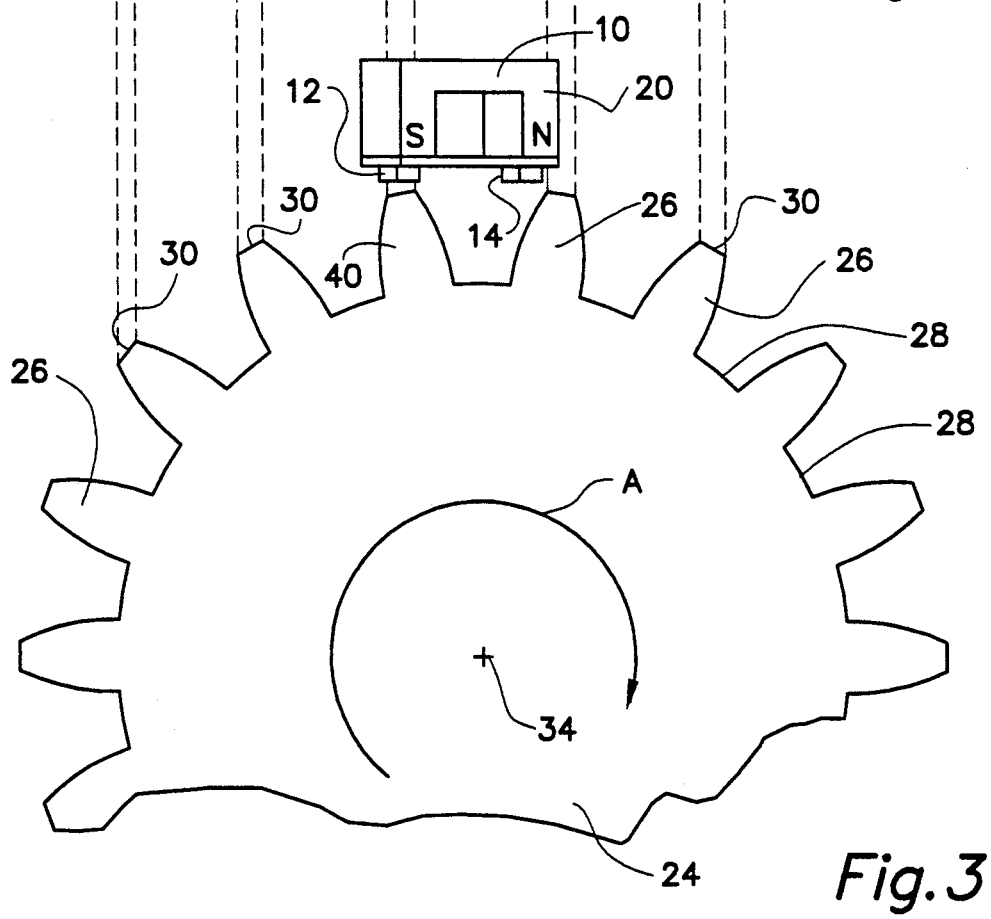
FIG. 3 is a side view of the illustration in FIG. 2.

FIGS. 2 and 3 illustrate the relative position of the sensor 10 and the rotatable member 24. In FIG. 2, the outer surface 30 at the distal end of each tooth is identified and the bottom surface of each space 28 is identified. As can be seen in FIG. 2, the first magnetically sensitive device 12 is disposed proximate an upper tooth surface 30 while the second magnetically sensitive device 14 is disposed proximate a space 28. As the rotatable member 24 rotates about its central axis 34, each of the two magnetically sensitive devices will sequentially experience both teeth and interstitial spaces. However, the spacing between the first and second magnetically sensitive devices, the spacing between the teeth of the rotatable member and the relative angle between the sensor 10 and the angle of rotation 34 assure that the first and second magnetically sensitive devices are always disposed proximate different regions of the rotatable member 24.

FIG. 3 is a side view of the illustration of FIG. 2. As the rotatable member 24 rotates about its central axis 34, as indicated by arrow A, the first and second magnetically sensitive devices are sequentially disposed proximate the discontinuities, or teeth, of the rotatable member. The first magnetically sensitive device 12 has an output signal which is representative of the magnitude and direction of the magnetic field in which is disposed. Similarly, the second magnetically sensitive device 14 also has an output signal which is representative of the strength and direction of the magnetic field in which it is disposed. With reference to FIG. 3, it can be seen that the magnetic field provided by magnet 20 proximate the first magnetically sensitive device 12 is effected by the proximity of tooth 40, whereas the magnetic field provided by the north pole of magnet 20 and in which the second magnetically sensitive device 14 is disposed is not affected by the direct proximity of a tooth 26. Therefore, the first and second output signals provided by the first and second magnetically sensitive devices will be different from each other because of the different strengths and directions of the magnetic fields in which they are disposed.

Figure 4:
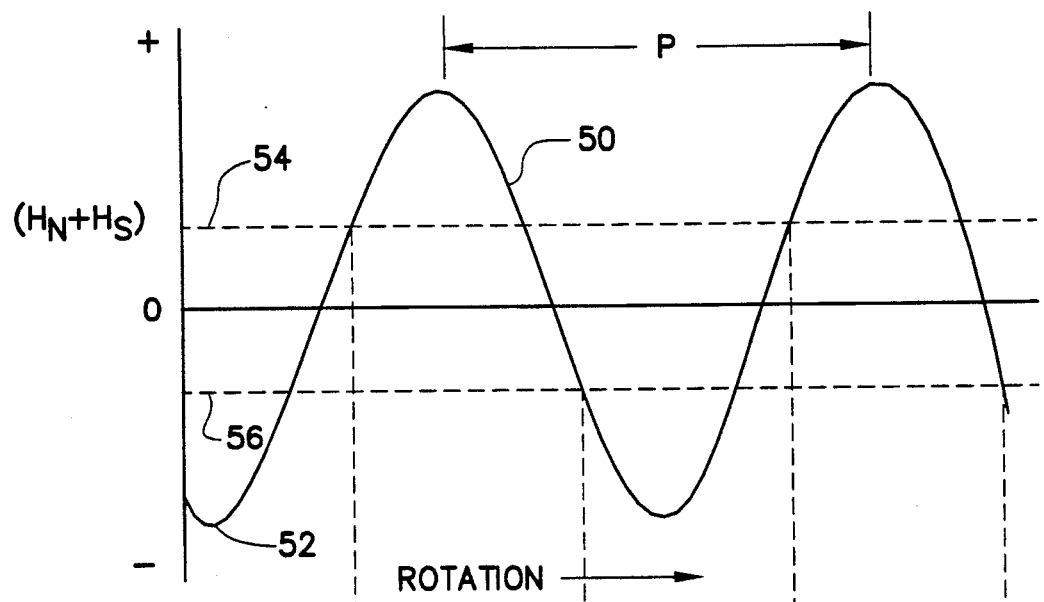
FIG. 4 shows a time-based waveform representative of the algebraic sum of signals provided by the present invention.
Figure 5:
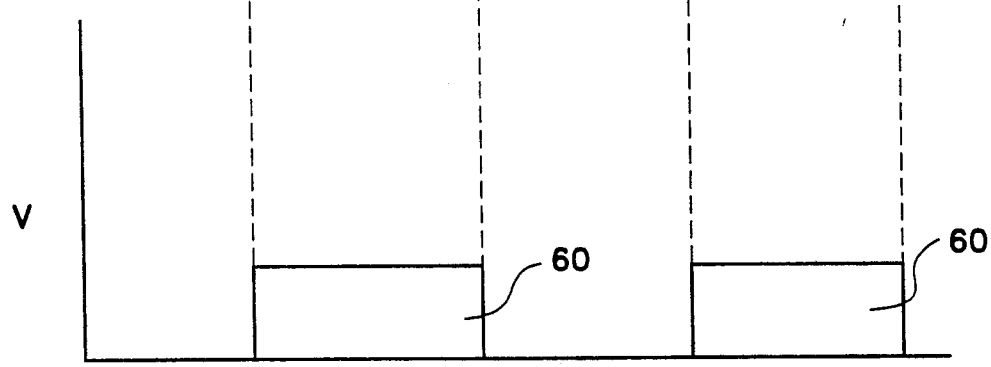
FIG. 5 shows the time-based fourth output signal provided by comparing the magnitude of the waveform in FIG. 4 to a reference value.

If the first output signal provided by the first magnetically sensitive device 12 is identified as $H_S$ because of its proximity to the south pole of magnet 20 and the second output of the second magnetically sensitive device 14 as identified as $H_N$ because of its proximity to the north pole of magnet 20, the algebraic sum of these two signals can be represented by the waveform shown in FIG. 4. As the rotatable member 24 is rotated about its centerline 34, the algebraic sum of the first and second output signals will represent a generally sinusoidal waveform such as that identified by reference numeral 50 in FIG. 4. It should be understood that the precise shape of the waveform 50 is a function of the shape and configuration of the teeth of the rotatable member. The distance P between peaks of the waveform 50 represents the arcuate distance between adjacent teeth. When the first magnetically sensitive device 12 is disposed proximate a face 30 of a geartooth 26, the algebraic sum of the first and second output signals reaches a maximum which can be negative or positive, depending on the position of the magnetically sensitive device relative to the magnet 20. For example, negative peak 52 of waveform 50 would be representative of the disposition of the first magnetically sensitive device 12 directly over the outer surface 30 while the second magnetically sensitive device 14 is disposed directly over a space 28. It should be apparent that alternative dimensions between the first and second magnetically sensitive devices can be applied in alternative embodiments of the present invention. In addition, the relative angle of disposition between the sensor of the present invention and the central axis of rotation of the rotatable member can be varied. The effect on the waveform 50 by these alternative positions can significantly change the maximum and minimum values of the waveform and, in some cases, may change the general sinusoidal shape of the waveform or invert its peaks. However, these alternative embodiments should be considered to be within the scope of the present invention. If an electronic circuit associated with the present invention is provided with means for comparing the magnitude of waveform 50 to reference values, the circuit can provide additional information relative to the position of the teeth in comparison to the position of the first and second magnetically sensitive devices. For example, if a first reference magnitude 54 and a second reference magnitude 56 are compared to the magnitude of the waveform 50 a third output signal can be provided. FIG. 5 shows the third output signal which is a square wave that is switched to a high output when the waveform 50 exceeds a first reference value 54 and switched low when the waveform 50 exceeds a second reference value 56. It should be apparent that the second reference value 56 shown in FIG. 4 is a negative value and that waveform 50 exceeds that second reference value 56 when its value becomes more negative than the reference value. A logic circuit can examine the results of the output pulses 60 of the third output signal and determine the position of the teeth relative to the sensor. For example, the presence of a high signal pulse 60 is representative of the presence of a tooth proximate the second magnetically device which, in turn, is disposed proximate the north pole of magnetic 20. By inverting the positions of the magnetically sensitive devices relative to the magnet, the waveform 50 can be inverted.

Figure 6:
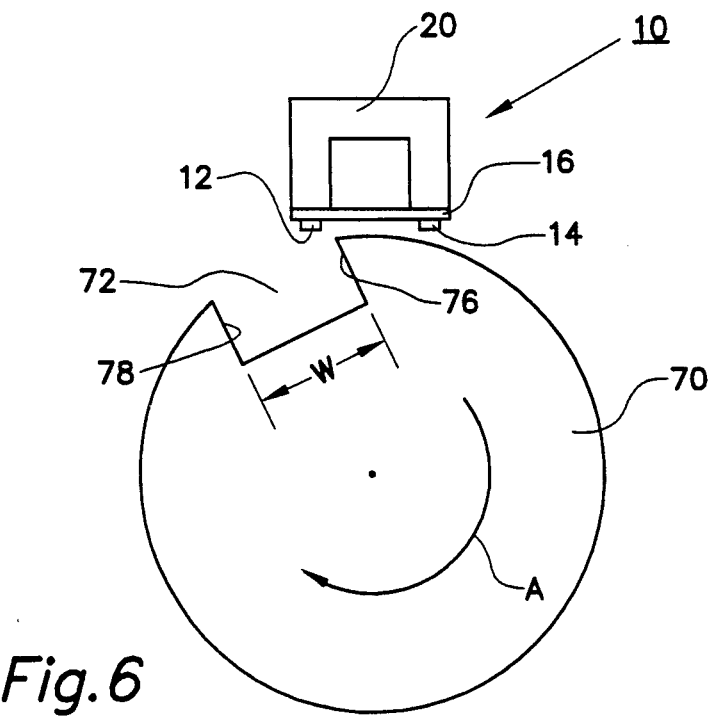
FIG. 6 shows an application of the present invention in association with a rotatable member having a single discontinuity in its surface.
Figure 7:
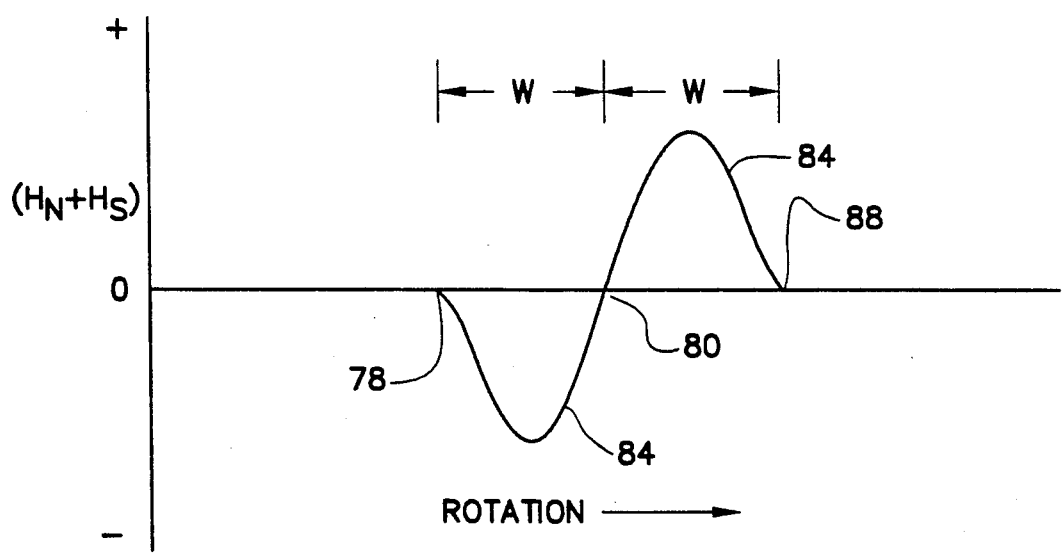
FIG. 7 shows a waveform that is provided by the present invention when applied in the manner shown in FIG. 6.

The present invention can be used in an alternative application which places it proximate a rotatable member 70 such as that shown in FIG. 6. The rotatable member 70 is provided with a single discontinuity 72. The sensor 10 is configured to be identical to the sensor 10 shown in FIGS. 1, 2 and 3. It comprises a magnet 20, a ceramic substrate 16 and first and second magnetically sensitive devices, 12 and 14, attached to the substrate. The sensor 10 is disposed proximate the rotatable member 70 so that the rotation of the rotatable member 70 in the direction indicated by arrow A in FIG. 6 causes the discontinuity 70 to sequentially pass proximate both the first and second magnetically sensitive devices. With reference to FIGS. 6 and 7, the rotation of the rotatable member 70 in the direction indicated by arrow A causes the first edge 76 to pass under the first magnetically sensitive device 12. This occurrence causes a deviation of the magnitude of the algebraic sum of the first and second output signals from the first and second magnetically sensitive devices because the second device is effected by the close proximity of the rotatable member's peripheral surface while the first device is over a depression and therefore not similarly effected. This deviation is shown in FIG. 7 and identified by reference numeral 78. If the width W of the discontinuity 72 is identical to the distance between the operative centers of the first and second magnetically sensitive devices, the algebraic sum of the first and second signals will be equal to zero when the first edge 76 is proximate the second magnetically sensitive device 14 and the second edge 78 is proximate the first magnetically sensitive device 12. This zero value of the algebraic sum of the first and second output signals is identified by reference numeral 80 in FIG. 7 and is the zero crossing point of the waveform 84. This zero crossing point 80 provides an accurate determination of the precise position of the rotatable member when it is in this particular angular position. When the second edge 78 of the discontinuity 72 passes the second magnetically sensitive device 14, the algebraic sum of the first and second signals again achieves a zero value. This point is indicated by reference number 88 in FIG. 7. When the discontinuity 72 is not proximate either of the two magnetically sensitive devices, the first and second output signals are equal in absolute magnitude, but of opposite polarity, and result in a sum having a zero algebraic magnitude. Although FIGS. 6 and 7 show the single discontinuity as being a slot, or depression, it could alternatively be a protrusion such as a single tooth extending radially from the rotatable member 70.

When associated with a rotatable member 70 which has a single discontinuity 72, the present invention provides significantly improved information relative to sensors known to those skilled in the art. For example, the zero crossing point 80 provides a precise indication of the relative rotational position of the rotatable member 70 which is relatively easy to identify and recognize with an electronic circuit intended to monitor the position of the rotatable member. In addition, since the distance identified by reference letter W is known and the time between sequential points 78, 80 and 88 can easily be measured, they can be used to determine the rotational speed of the rotatable member 70. Alternatively, the total time between successive occurrences of crossovers such as that identified by reference numeral 80 can be measured to determine the rotational speed of the rotatable member 70. In addition, the polarity change direction of waveform 84 at the zero crossing 80 indicates the direction of rotation of the device.

Two distinct applications of the present invention have been illustrated and described above. The first application is associated with a gear having a plurality of teeth in its outer periphery. The second application is associated with a shaft, or rotatable member, which has a single discontinuity in its outer surface. The use of the present invention provides advantages in both applications. When used as a geartooth sensor, the present invention enables an associated circuit to detect the position of the rotatable member when the circuit of the sensor is initially powered. When used in the manner illustrated in FIG. 6, the present invention permits the speed of a rotatable member having one discontinuity to be determined and, in addition, provides a precise signal point, such as zero crossover 80, to accurately define a position of the rotatable member in an exact manner.

Figure 8:
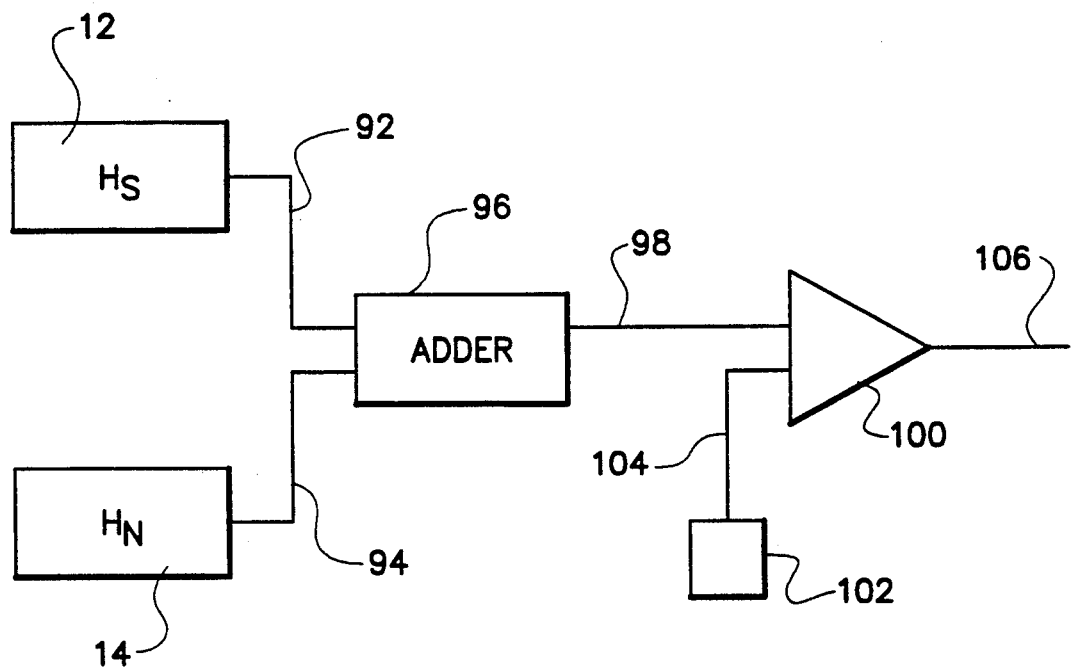
FIG. 8 shows an exemplary schematic circuit that can be used to provide the signals which are made available by the present invention.

Although many different electronic circuits are well known to those skilled in the art for treating the signals provided by Hall effect transducers in sensor applications, FIG. 8 shows a simplified schematic diagram of a circuit which can be used in association with the present invention. The first and second magnetically sensitive devices, 12 and 14, are identified as the sources of signals $H_S$ as $H_N$ as discussed above. The first output signal on line 92 and the second output signal on line 94 are provided as inputs to a device 96 which algebraically adds the two signals together and provides an output signal on line 98 which represents the algebraic sum of the first output signal $H_S$ from the first magnetically sensitive device 12 and the second output signal $H_N$ from the second magnetically sensitive device 14. This third output signal on line 98 is provided to a comparator 100 with electrical hysteresis which compares the magnitude of the algebraic sum to a reference value provided on line 104 by a suitable source 102. The output, on line 106 is a fourth output signal that represents the relative value of the third output signal compared to a reference signal. For example, the output on line 106 could be the signal 60 illustrated in FIG. 5.

Although the present invention has been described with significant specificity and illustrated to show particular applications of the present invention, it should be understood that alternative embodiments of the present invention are within its scope.

The embodiments of the invention in which an exclusive property or right is claimed are defined as follows:

1. A sensor, comprising:
   a first magnetically sensitive device having a first output signal that is representative of the magnitude and direction of a magnet field in which said first magnetically sensitive device is disposed;
   a second magnetically sensitive device having a second output signal that is representative of the magnitude and direction of a magnetic field in which said second magnetically sensitive device is disposed;
   means, associated with said first and second magnetically sensitive devices, for disposing said first magnetically sensitive device in a magnetic field of a first direction and for disposing said second magnetically sensitive device in a magnetic field of a second direction; and
   means for adding said first and second output signals algebraically to form a third output signal, said sensor being disposed proximate a rotatable member having a surface with at least one discontinuity with said first and second magnetically sensitive devices being positioned to be sequentially proximate said discontinuity in response to movement of said rotatable member.

2. The sensor of claim 1, wherein:
   said discontinuity is a depression formed in said surface.

3. The sensor of claim 1, wherein:
   said rotatable member comprises a plurality of teeth formed in said surface with a depression formed in said surface between each pair of adjacent pair of said teeth.

4. The sensor of claim 1, wherein:
   said first magnetically sensitive device is a Hall Effect device.

5. The sensor of claim 4, wherein:
   said second magnetically sensitive device is a Hall Effect device.

6. The sensor of claim 1, further comprising:
   first means, connected in signal communication with said adding means, for providing a fourth output signal when the magnitude of said third output signal exceeds a first predetermined value.

7. A sensor, comprising:
   a first magnetically sensitive device having a first output signal that is representative of the magnitude and direction of a magnetic field in which said first magnetically sensitive device is disposed;
   a second magnetically sensitive device having a second output signal that is representative of the magnitude and direction of a magnetic field in which said second magnetically sensitive device is disposed;
   means, associated with said first and second magnetically sensitive devices, for disposing said first magnetically sensitive device in a magnetic field of a first direction and for disposing said second magnetically sensitive device in a magnetic field of a second direction; and
   means for combining said first and second output signals algebraically to form a third output signal, said sensor being disposed proximate a movable member having a surface with at least one discontinuity with said first and second magnetically sensitive devices being positioned to a sequentially proximate said discontinuity in response to movement of said movable member;
   said movable member being a rotatable member with said discontinuity being a depression formed in said surface;
   said first magnetically sensitive device being a Hall Effect device;
   said second magnetically sensitive device being a Hall Effect device; and
   first means, connected in signal communication with said combining means, for providing a fourth output signal when the magnitude of said third output signal exceeds a predefined relationship to a first predetermined value.

8. The sensor of claim 7, wherein:
   said disposing means is a U-shaped magnet.

* * * * *